United States Patent Office 3,490,892
Patented Jan. 20, 1970

3,490,892
AMMONIATION-GRANULATION PROCESS
WHEREIN AN ACID SOLUBLE SALT IS
ADDED TO THE GRANULATION ZONE
Theodore B. Simpson, 514 E. Front St.,
New Bern, N.C. 28560
No Drawing. Filed Oct. 24, 1966, Ser. No. 588,703
Int. Cl. C05b 19/00, 21/00
U.S. Cl. 71—34        7 Claims

ABSTRACT OF THE DISCLOSURE

Granulation in a conventional ammoniator-granulator is improved by adding in an amount from 0.05 to 0.5 times the $P_2O_5$ concentration, an acid soluble salt of magnesium, iron, calcium or aluminum to the granulator bed.

---

This invention pertains to the granulation of fertilizers, and more particularly, to improvements in such granulation processes.

Prior to 1920 natural organics were the principal source of fertilizer material. However with the development of the steel industry, by-product ammonium sulfate from coke ovens became an important source. The use of anhydrous ammonia and ammoniating solutions for direct application into the ground followed the ammonium sulfate development. During the past fifteen years consumption of fertilizers has more than doubled and mixed fertilizer has become the principal form used by the farmer. Mixed fertilizers contain all three plant nutrients: nitrogen; available phosphate, as $P_2O_5$; and potassium, expressed as $K_2O$. As the average analysis of mixed fertilizers rose to supply the demand for high analysis grades, problems of caking increased, and the mixed fertilizer product became more difficult to distribute evenly. Granulation, however, lessens or prevents caking in storage and facilitates uniform application of the fertilizer. From a technological view point, therefore, perhaps the most significant development has been the relatively recent change to granulation processes. The transition from fine superphosphate to granular mixed fertilizers was primarily due to the need for an improvement in physical properties.

The granulation of fertilizers contemplates the act of forming, crystallizing and cooling the fertilizer in granules having some degree of uniformtiy, and with the exclusion of powder and large lumps. Granular fertilizers flow readily from a bag or storage bin. In addition they are hard and strong enough to stand mechanical handling in farm equipment. Mixed granular phosphate fertilizers have, therefore, been found to be much more effective than fine superphosphate fertilizers. As a consequence developments in fertilizer granulation processes proceeded rapidly and now more than half of all solid fertilizer is in the form of granular mixed fertilizers. With the realization of the advantages of granulation, there has been a demand for improvements in the quality of granular materials. Understandably a plant capable of making only mediocre granular fertilizer is likely to be a poor investment.

For a better understanding of the invention, a granulation process preliminarily will be generally described. Granulation processes are sometimes differentiated by whether or not there is a preneutralizer. The most widely used process omits the preneutralizer and combines mixing, chemical reaction and granulation in a single operation. A preneutralizer is used in instances where the amount of liquid in the ammoniator otherwise would run too high.

Briefly the reaction of ammonia with concentrated phosphoric acid, such as wet process phosphoric acid, and the granulation of the product take place in rotary drums containing acid and ammonia spargers, granulation being brought about by cascading of the bed along the inside walls of the rotating drum. The granular wet discharge is then conveyed to a cylindrical rotating drier and subsequently to screening means. After screening and grinding, over and under sized solids are recycled. The net production rate depends on the throughput rate and recycle ratio, net production rate being the ratio of throughput rate to 1 plus the recycle ratio.

Whereas temperatures of 100° F. to 140° F. have been used, a moderately high temperature usually favors granulation. With most grades a range of 150° F. to 250° F. is more suitable. When heat of reaction is insufficient, steam is employed or the formulation is modified to increase the temperature. Ideally the amount of ammonia employed is that stoichiometric quantity sufficient to react with the phosphoric acid. However losses of free $NH_3$ from the ammoniator tend to increase as the degree of ammoniation is increased. The standard degree of ammoniation in pounds of free $NH_3$ per unit of $P_2O_5$ is 3.8 for triple superphosphate, 5.8 for ordinary superphosphate and 7.2 for phosphoric acid. The ammonia and spargers should be located in the deepest sector of the bed, and they should be buried to about ¾ of the bed depth. Commonly an 18 inch deep bed is employed with spargers about 13.5 inches beneath the surface.

Granulation technology is fact advancing as an important chemical engineering operation. The trend toward higher quality material means careful location of spargers, accurate maintenance of bed depth and careful heat control. Particle size must be uniform, otherwise more recycling of offsize materials will be necessary. In addition the moisture content and hardness of granules are important. Too much moisture leads to undesirable caking whereas when granules are too soft they will break up during the granulation process, particularly in the drier, and will have to be recycled with offsize particles. Improvements in granulated material thus demand closer sizing, more thorough drying and various conditioning treatments. This invention, in a particular aspect, relates to such conditioning treatments.

A number of theories concerning granulation parameters have been advanced, but it is generally agreed that a liquid phase is necessary to cause plasticity, and that moisture is an important variable. Too little plasticity will result in an excessive amount of fines in the system, whereas too much liquid phase will cause large masses to form, which eventually become unmanageable. Temperatures and composition of the formulation are also critical factors. It can be seen, therefore, that for a material to be granulated satisfactorily some means of controlling the degree of agglomeration are essential.

In accordance with this invention it has been found that in the case of phosphoric derived products, especially condensed $H_3PO_4$ resulting from the super wet process having a $P_2O_5$ concentration in the range of sixty to eighty percent, certain salts so affect agglomeration that granulation takes place more readily. This leads to an increase in the rate of granulation as exhibited by the throughput rate. By the practice of this invention acid soluble salts of iron, calcium aluminum and magnesium have been found to influence plasticity and moisture content, additionally resulting in harder granules of the ammoniated phosphoric acids. These metals, added as sulfates, chlorides, phosphates and the like, can be added to the dry ingredients in the granulator. However, they are more effective when added as fine or dissolved solids to the acid feed stream. Their effect on the nature and hardness of the ammoniated phosphoric acid, the increase in production per unit time, and other aspects of the invention will best be understood by reference to specific data which resulted from the process when carried out as follows:

The process was conducted in a pilot plant having a capacity of about 2,000 pounds of granular product per hour. Potassium chloride, recycled fines, and any other materials such as triple superphosphate and sand, if used, were fed by volumetric feeders onto a conveying belt and then into the ammoniator. The ammoniator, 3 feet in diameter by 3 feet long was rotated at about 12 r.p.m. The bed depth was maintained at approximately 10 inches, which at the operating throughput gives a reaction time of about 15 minutes. Ammonia or ammoniating solutions, or mixtures of the two, were injected 8 inches under the bed of material through spargers. Phosphoric acid, preferably super concentrated wet process phosphoric acid, and steam, if used, entered through an adjacent distributor. Material from the ammoniator-granulator flowed through a chute into a rotary drier. A set of screens sized the product to approximately 16 x 16 mesh. Undersized product was recycled to the ammoniator.

TABLE I.—OPERATING DATA

|  | A | B |
|---|---|---|
| Grade (N plus $P_2O_5$ plus $K_2O$) | 15-15-15 | 8-32-16 |
| Process flow rates, tons/hour | 0.4-1.0 | 0.3-1.0 |
| Product output | 0.1-0.5 | 0.1-0.5 |
| Recycle | 0.3-0.6 | 0.08-0.5 |
| Materials (lbs. per hour): |  |  |
| Nitrogen solution (45% N) | 322 |  |
| Ammonia, anhydrous | 91 | 207 |
| Sulfuric acid, 60° Be | 218 |  |
| Potassium chloride | 501 | 540 |
| Wet process phosphoric acid [1] | 442 | 697 |
| Superphosphate, triple |  | 397 |
| Filler, sand |  | 191 |
| Ammonium sulfate | 500 |  |
| Temperatures, ° F.: |  |  |
| Ammoniator | 200-250 | 180-220 |
| Dryer | 190-220 | 190-220 |
| Granulation promoting salt [2]: |  |  |
| Aluminum chloride | 0-4 |  |
| Magnesium sulfate |  | 0-4 |
| Ferric phosphate | 0-4 | 0-4 |

[1] Concentration used is given in Tables II and III. Weight here is calculated as acid containing 70% $P_2O_5$.
[2] Quantity used is given in Tables II and III.

Using the materials and conditions set forth in Table I and the pilot plant process described hereinabove, the net production rate can be increased, and other advantages result as will be apparent from the following tables. The wet process phosphoric acid employed contained two percent iron, aluminum, calcium or magnesium salt, calculated as the oxide. Accordingly the quantity given in the table is the percent added to this two percent already present. Representative salts are acid soluble salts, for example sulfates, phosphates, chlorides, acid sulfates and other salts soluble in a super-wet acid.

TABLE II.—FERTILIZER A

| Acid percent $P_2O_5$ | Salt added | Percent salt added | Recycle ratio | Throughput, lbs./hr. | Quality of product | Net prod. rate |
|---|---|---|---|---|---|---|
| 70 | None |  | 2.5:1 | 1,000 | Fair | 300/hr. |
| 70 | $AlCl_3$ | 4 | 1:1 | 2,000 | Excellent, hard | 1,000/hr. |
| 70 | $FePO_4$ | 4 | 1:1 | 2,000 | do | 1,000/hr. |
| 70 | $MgSO_4$ | 4 | 1.5:1 | 1,500 | Good, hard | 600/hr. |
| 54 | None |  | 3:1 | 800 | Fair | 200/hr. |
| 54 | $AlCl_3$ | 4 | 1:1 | 1,500 | Good, hard | 750/hr. |
| 54 | $FePO_4$ | 4 | 1:1 | 1,500 | do | 750/hr. |
| 70 | $Ca(H_2PO_4)_2$ | 4 | 1.6:1 | 2,000 | Good | 800/hr. |
| 70 | Wet acid sludge (Fe plus Al) | 4 | 1:1 | 2,000 | Excellent | 1,000/hr. |

TABLE III.—FERTILIZER B

| Acid percent $P_2O_5$ | Salted added | Percent salt added | Recycle ratio | Throughput, lbs./hr. | Quality of Product | Net prod. rate |
|---|---|---|---|---|---|---|
| 70 | None |  | 2:1 | 800 | Fair, damp | 270/hr. |
| 70 | $AlCl_3$ | 4 | 1:1 | 2,000 | Excellent, hard and dry | 1,000/hr. |
| 70 | $FePO_4$ | 4 | 1:1 | 2,000 | do | 1,000/hr. |
| 54 | None |  | 2:1 | 600 | Fair | 200/hr. |
| 54 | $AlCl_3$ | 4 | 1.5:1 | 1,500 | Good, hard | 600/hr. |
| 54 | $FePO_4$ | 4 | 1.5:1 | 1,500 | do | 600/hr. |

As can be seen from Tables II and III the production rate is increased at various phosphoric acid concentrations by the use of the process of this invention. The recycle ratio is decreased by the process of the invention. In addition the fertilizer granules which result from the process are harder and, in some instances, drier when produced with the granulation promoting salts of this invention.

The quantity of promoting salt which should be present during granulation is best expressed in terms of the percent $P_2O_5$ in the concentrated phosphoric acid employed. The granulation promoting salt, expressed as percent oxide, should be present in an amount of at least 0.05Z and preferably at least 0.06Z wherein Z is the precent $P_2O_5$ in the concentrated phosphoric acid employed. As shown by the foregoing data, some salt may already be present in the system since small quantities have been found in the phosphoric acid. More salt, up to 0.5Z can be employed. However additional salt merely dilutes the system.

Two grades of mixed N+$P_2O_5$+$K_2O$ fertilizer are shown. Obviously various grades such as 14-14-14, 12-12-12, 10-10-10, 16-20-0 and 10-20-0 or straight ammonium phosphate fertilizer can be produced. In fact, some thirty different grades of mixed fertilizer have been produced commercially. These and other embodiments and variations will be obvious to one skilled in the art. For example, as set forth hereinbefore the salt can be added with the solid materials as well as with the liquid feeds. In addition granules of various sizes ranging from six mesh to sixty-five mesh can be made. These and other ramifications are deemed to be within the scope of this invention.

What is claimed is:

1. In the process for the granulation of mixed phosphate fertilizers which combines mixing, ammoniation and granulation in one operation by subsurface sparging wherein concentrated wet process phosphoric acid and anhydrous ammonia in an amount required to react with the phosphoric acid are distributed evenly under a rolling bed of solids containing granular ammonium phosphate at rates such that a temperature of 100° F. to 250° F. is maintained by the heat of reaction, the improvement comprising when the wet process phosphoric acid has a $P_2O_5$ concentration in the range of 54 to 80 percent adding to the rolling bed an acid soluble salt of one of aluminum, calcium, iron and magnesium, and effecting the granulation with said salt in admixture with the solids in the rolling bed to confer increased and improved hardness characteristics on the fertilizer granules, the granulation promoting salt, expressed as percent oxide, being present in an amount of $0.05Z$ to $0.5Z$ where Z is the percent $P_2O_5$ in the concentrated phosphoric acid employed.

2. The process of claim 1 wherein the granulation promoting salt is aluminum sulfate, present in an amount, expressed as the oxide, of $(0.06$ to $0.5)Z$ wherein Z is the percent $P_2O_5$ in the concentrated phosphoric acid employed.

3. The process of claim 1 wherein the granulation promoting salt is ferric chloride, present in an amount, expressed as the oxide, of $(0.06$ to $0.5)Z$ wherein Z is the percent $P_2O_5$ in the concentrated phosphoric acid employed.

4. The process of claim 1 wherein the granulation promoting salt is magnesium phosphate, present in an amount, expressed as the oxide, of $(0.06$ to $0.5)Z$ wherein Z is the percent $P_2O_5$ in the concentrated phosphoric acid employed.

5. The process of claim 1 wherein the granulation promoting salt is calcium acid phosphate, present in an amount, expressed as the oxide, of $(0.06$ to $0.5)Z$ wherein Z is the precent $P_2O_5$ in the concentrated phosphoric acid employed.

6. The process of claim 1 wherein the granulation promoting salt is added as a wet acid sludge, the salt therein being present in an amount, expressed as the oxide, of $(0.06$ to $0.5)Z$ wherein Z is the percent $P_2O_5$ in the concentrated phosphoric acid employed.

7. The process of claim 1 wherein sulfuric acid is added with the phosphoric acid, wherein the solid bed contains ammonium sulfate and a potassium salt to form a mixed $N+P_2O_5+K_2O$ fertilizer and wherein the granulation promoting salt, expressed as percent oxide, is present in an amount of at least $(0.06$ to $0.5)Z$ wherein Z is the percent $P_2O_5$ in the concentrated phosphoric acid employed.

References Cited

UNITED STATES PATENTS

| | | | |
|---|---|---|---|
| 3,005,696 | 10/1961 | Hignett et al. | 71—43 X |
| 2,968,543 | 1/1961 | Nees et al. | 71—37 |
| 3,177,063 | 4/1965 | Andrès et al. | 71—37 |

S. LEON BASHORE, Primary Examiner

R. D. BAJEFSKY, Assistant Examiner

U.S. Cl. X.R.

71—43, 63, 64